(12) United States Patent
Fukuda et al.

(10) Patent No.: US 8,219,760 B2
(45) Date of Patent: Jul. 10, 2012

(54) STORAGE SUBSYSTEM AND ITS CONTROL METHOD

(75) Inventors: Hideaki Fukuda, Odawara (JP); Nobuyuki Minowa, Ooi (JP); Naoki Moritoki, Odawara (JP); Masanori Takada, Yokohama (JP); Masato Shimizu, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 520 days.

(21) Appl. No.: 12/526,663

(22) PCT Filed: Apr. 6, 2009

(86) PCT No.: PCT/JP2009/057408
§ 371 (c)(1),
(2), (4) Date: Aug. 11, 2009

(87) PCT Pub. No.: WO2010/116536
PCT Pub. Date: Oct. 14, 2010

(65) Prior Publication Data
US 2011/0296117 A1 Dec. 1, 2011

(51) Int. Cl.
G06F 13/00 (2006.01)
G06F 12/14 (2006.01)

(52) U.S. Cl. .......... 711/147; 711/154; 711/E12.001

(58) Field of Classification Search .......... None
See application file for complete search history.

(56) References Cited

U.S. PATENT DOCUMENTS

| 7,421,532 B2 | 9/2008 | Stewart et al. |
| 2006/0265561 A1 | 11/2006 | Boyd et al. |
| 2007/0180188 A1 | 8/2007 | Fujibayashi et al. |
| 2007/0220195 A1 | 9/2007 | Kawaguchi |
| 2009/0006890 A1 | 1/2009 | Takada et al. |

FOREIGN PATENT DOCUMENTS

| EP | 1 785 828 A1 | 5/2007 |
| EP | 1 818 794 A2 | 8/2007 |
| JP | 2007-207007 A | 8/2007 |
| JP | 2009-9200 A | 1/2009 |

Primary Examiner — Kevin Verbrugge
(74) Attorney, Agent, or Firm — Mattingly & Malur, PC

(57) ABSTRACT

Provided is a storage subsystem capable of maintaining the reliability of I/O processing to a host apparatus, even if there is an unauthorized access from a processor core to a switch circuit, by applying a multi-core system to a processor. A multi-core processor is applied to a second logical address space that is different from a first logical address space to be commonly applied to multiple controlled units such as a host interface to be accessed by the processor. The switch circuit determines the processor core that issued an access based on an address belonging to a second address space, and maps an address containing in an access from the processor core to an address of a first address space.

15 Claims, 24 Drawing Sheets

FIG.10

| MAPPING TABLE | SETTING VALUE |
|---|---|
| TABLE 1<br>(FOR PROCESSOR CORE #1) | 0x1000000_40000000<br>(PART OF HOST I/F UNIT ADDRESS) |
| TABLE 2<br>(FOR PROCESSOR CORE #1) | 0x1100000_40000000<br>(PART OF HOST I/F UNIT ADDRESS) |
| TABLE 3<br>(FOR PROCESSOR CORE #1) | 0x4000040_80000000<br>(PART OF CACHE MEMORY UNIT ADDRESS) |
| . . . | . . . |
| TABLE N + 1<br>(FOR PROCESSOR CORE #2) | 0x4000000_80000000<br>(PART OF CACHE MEMORY UNIT ADDRESS) |
| . . . | . . . |

FIG.18

| # | ACCESS SOURCE | ACCESS CONTENTS |
|---|---|---|
| 1 | PROCESSOR CORE | TRANSFER PARAMETER SETTING OF PROTOCOL CONTROLLER OF HOST I/F AND DISK I/F |
| 2 | PROCESSOR CORE | TRANSFER REQUEST OF PROTOCOL CONTROLLER OF HOST I/D AND DISK I/F |
| 3 | PROCESSOR CORE | DMA PARAMETER SETTING AND START-UP OF HOST I/F AND DISK I/F |
| 4 | PROCESSOR CORE | PARAMETER SETTING AND START-UP OF PARITY OPERATION PART |
| 5 | PROCESSOR CORE | CONTROL DATA UPDATE OF CACHE MEMORY |
| 6 | PROCESSOR CORE | CONTROL DATA REFERRAL OF CACHE MEMORY |
| 7 | HOST I/F | COMMAND NOTICE FROM ASSOCIATED CONTROLLER SORTING UNIT TO LOCAL MEMORY UNIT |
| 8 | HOST I/F | TRANSFER COMPLETION NOTICE FROM PROTOCOL CONTROLLER TO PROCESSOR CORE |
| 9 | HOST I/F | TRANSFER COMPLETION NOTICE FROM DMA TO PROCESSOR CORE |
| 10 | DISK I/F | TRANSFER COMPLETION NOTICE FROM PROTOCOL CONTROLLER TO PROCESSOR CORE |
| 11 | DISK I/F | TRANSFER COMPLETION NOTICE FROM DMA TO PROCESSOR CORE |
| 12 | DISK I/F | TRANSFER COMPLETION NOTICE FROM PARITY OPERATION PART TO PROCESSOR CORE |

FIG.21

| LOGICAL DEVICE NUMBER (LDEV#) | HOST S_ID | LUN# | ASSOCIATED CONTROLLER |
|---|---|---|---|
| 0 | 0 | LUN#1 | CONTROLLER A |
| 2 | 0 | LUN#2 | CONTROLLER B |
| 3 | 3 | LUN#2 | CONTROLLER B |
| ⋮ | ⋮ | ⋮ | ⋮ |

FIG.22

| CONTROLLER INFORMATION | PROCESSOR CORE OPERATIONAL STATUS | | | |
|---|---|---|---|---|
| | #1 | #2 | #3 | #4 |
| CONTROLLER A | VALID | VALID | VALID | VALID |
| CONTROLLER B | VALID | FAILURE | VALID | VALID |

FRONT FACE

BACK FACE

STORAGE SUBSYSTEM AND ITS CONTROL METHOD

TECHNICAL FIELD

The present invention relates to a storage subsystem and a control method of such a storage subsystem.

BACKGROUND ART

A storage subsystem is an apparatus for providing a data storage service to a host apparatus. A storage system is configured by a host apparatus being connected to a storage subsystem. A storage subsystem comprises a disk array device configured from a plurality of hard disk drives as memory devices, and a controller for controlling the input and output of data between the host apparatus and the disk array device.

The controller comprises a processor for controlling the overall storage subsystem, a host interface to the host apparatus, and a disk interface to the disk array device, and a cache memory for caching user data is arranged between both interfaces.

This kind of storage subsystem is described, for example, in Japanese Patent Laid-Open Publication No. 2009-9200. This storage subsystem has a structure where a controller including a plurality of processors is connected to a host interface, a disk interface, and a cache memory with a switch LSI.

In this storage system, if a failure occurs in any one of the components in the controller, the I/O path of the controller is cut off, and a component that failed in this cutoff status is identified and disabled. After the failed component is disabled, whether the intended processing can be performed with only the normal components is determined, and, if it is determined that this is possible, the cutoff of the I/O path is cancelled (released), and the operation is resumed after restart.

Moreover, Japanese Patent Laid-Open Publication No. 2007-207007 describes a storage system comprising a disk drive and a storage controller. The storage controller comprises one or more interfaces to be connected to a host computer, and a plurality of processors to be connected to the interfaces. The processors provide one or more logical access ports to the host computer, and the interfaces store routing information showing the processing to process the access request addressed to the logical access port. If an interface receives an access request from the host computer, it extracts an address from the received access request and, based on the routing information and the extracted address, identifies the processor to process the received access request, and transfers the received access request to the identified processor.

In addition, U.S. Pat. No. 7,421,532 describes a method for realizing a multirate structure with address mapping based on a switch LSI.

RELATED ART DOCUMENTS

Patent Documents

[Patent Document 1] Japanese Patent Laid-Open Publication No. 2009-9200
[Patent Document 2] Japanese Patent Laid-Open Publication No. 2007-207007
[Patent Document 3] U.S. Pat. No. 7,421,532

DISCLOSURE OF THE INVENTION

In a large-scale storage system, a multi-core processor is being used in order to improve the control performance of the subsystem. Japanese Patent Laid-Open Publication No. 2009-9200 described above also describes that the processor includes a plurality of processor cores.

When the switch LSI receives an access from a processor core, it routes the access to the host interface, the disk interface or the cache memory based on the access destination address. If the switch LSI receives an unauthorized access from the processor core, it notifies the processor core of the occurrence of a failure. The processor core that received this notice executes a failure response processing program in preference to the normal storage control processing.

Meanwhile, since a conventional storage subsystem is unable to distinguish the plurality of processor cores with respect to one another, if the switch LSI receives an unauthorized access from a certain processor core, the switch LSI notifies the occurrence of a failure to all processor cores.

In the foregoing case, since the normal processor cores will also be forced to perform failure response processing, the storage subsystem will not be able to perform the I/O processing during that time. Consequently, the storage subsystem will not be able to maintain the reliability of the I/O processing to the host apparatus.

The present invention was devised to overcome the foregoing problems. Thus, an object of this invention is to provide a storage subsystem and its control method capable of maintaining the reliability of I/O processing to a host apparatus, even if there is an unauthorized access from a processor core to a switch circuit, by applying a multi-core system to a processor.

In order to achieve the foregoing object, the present invention provides a storage subsystem in which a multi-core processor is applied to a second logical address space that is different from a first logical address space to be commonly applied to multiple controlled units such as a host interface to be accessed by the processor.

The storage subsystem flexibly applies a second logical address that is different from the common address to the respective processor cores. For instance, a different address is applied to each processor core. The processor core accesses the switch LSI using this address. The switch circuit is able to distinguish the logical address contained in the access from the processor core, and identify the processor core as the access source.

The switch circuit maps a unique address contained in the access of the processor core to a common address. This mapping is performed using a mapping table. In order for the plurality of processor cores to respectively use a different logical address, each processor core also has a different mapping table. An example of the mapping method is adding a setting value contained in the mapping table to the address contained in the access of the processor core so as to enable the access of the processor core to the shared address. A processor including a plurality of processor cores selects a specific processor core and issues an access so that it can access the intended specific shared address.

According to the present invention, it is possible to provide a storage subsystem in which a multi-core processor is applied to a second logical address space that is different from a first logical address space to be commonly applied to multiple controlled units such as a host interface to be accessed by the processor.

BRIEF DESCRIPTION OF THE DRAWINGS

FIG. 10 is a table showing an example of a mapping table;

FIG. 18 is a table that summarizes a representative example of an access between a plurality of components via a switch LSI;

FIG. 21 is an example of a maintenance screen of a storage subsystem;

FIG. 22 is another example of a maintenance screen;

EXPLANATION OF REFERENCE NUMERALS

10 Storage Subsystem
12 Host Apparatus
16 (16A, 16B) Storage Controller
18 Switch Circuit
20 (20A, 20B) Host I/F Circuit
22 (20A, 20B) Cache Memory
24 (24A, 24B) Disk I/F Circuit
28 Multi-core Processor

BEST MODE FOR CARRYING OUT THE INVENTION

Figure 1:
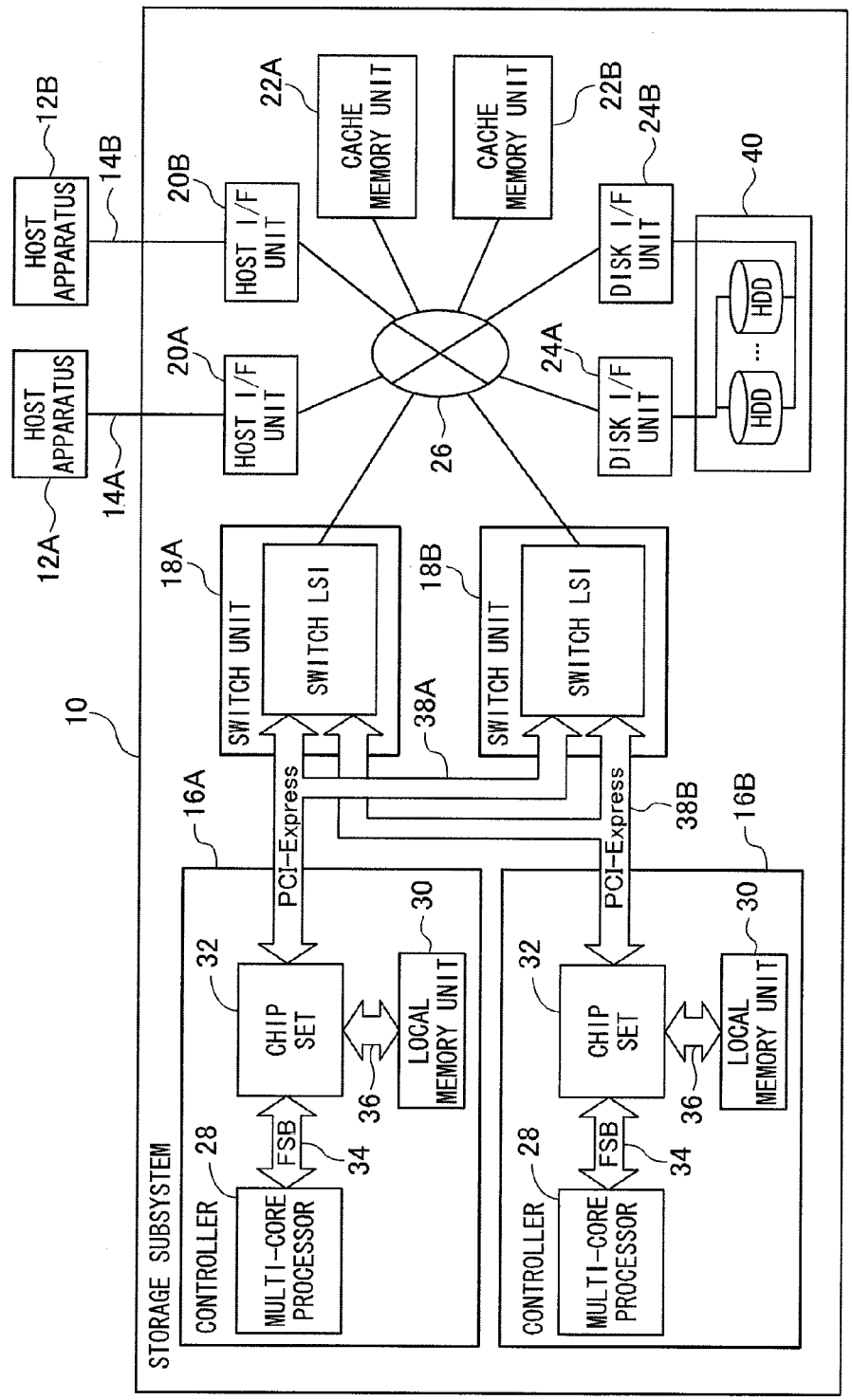
FIG. 1 is a hardware block diagram showing an embodiment of a storage system.

An embodiment of the present invention is now explained. FIG. 1 is a hardware block diagram showing an embodiment of a storage system. The storage system comprises a storage subsystem 10, and a host apparatus 12 (12A, 12B) connected thereto. The storage subsystem 10 is connected to the host apparatus 12 via network 14 (14A, 14B).

The storage subsystem 10 comprises a controller 16 (16A, 16B), a controlled unit group such as a host interface (host I/F) in which the operation for data storage is controlled with the controller, and a switch unit 18 (18A, 18B) for connecting the two. The switch unit 18 comprises a switch LSI.

The controlled unit group is configured from a host I/F unit 20A connected to the host apparatus 12A, a host I/F unit 20B connected to the host apparatus 12B, a cache memory unit 22 (22A, 22B), and a disk I/F unit 24 (24A, 24B). Each of the controlled unit groups and the switch unit 18 are mutually connected via an internal network 26.

The controllers 16A and 16B respectively comprise a processor 28 configured from a multi-core structure, a local memory unit 30, and a chip set 32. The controller 16 decides the overall operation of the storage subsystem 10 by controlling the controlled unit group. The multi-core processor 28 of each controller is in charge of performing the control. The processing to be performed by the multi-core processor is parallel processing to be performed by a plurality of processor cores.

The local memory unit 30 stores control data associated with the user data stored in the cache memory unit 22, and other information such as system configuration information. The control data includes management information that is required for the execution of a storage service to be provided by the storage subsystem 10 to the host apparatus 12.

Figure 2:
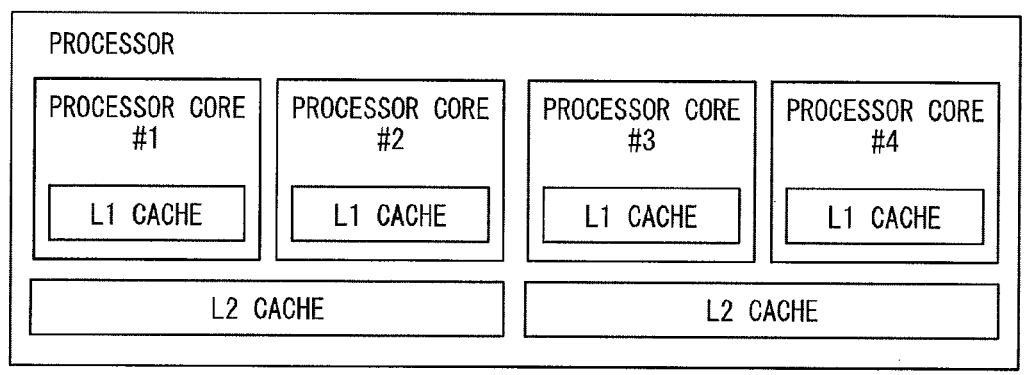
FIG. 2 is a hardware block diagram of a multi-core processor of a controller.

FIG. 2 is a block diagram of the multi-core processor 28 of the controller 16. The multi-core processor comprises four processor cores (#1 to 4). Each processor core internally comprises an L1 cache, and externally has an L2 cache 213 to be shared by two processor cores.

Each processor core 211 comprises a register for registering a failure notice from the switch LSI. The processor core that refers to the register and recognizes the failure notice calls the failure processing program and executes such program in order to perform failure recovery processing, or performs processing for blocking the processor core.

The multi-core processor 28 and the chip set 32 are connected via a front side bus (FSB) 34. The chip set 32 and the local memory unit 30 are connected via a data signal line 36. The chip set 32 functions as a bridge for mutually connecting the multi-core processor 28, the switch unit 18, and the local memory unit 30.

The chip set 32 and the switch unit 18 (18A, 18B) of the controller 16A are connected via PCI-Express 38A, and the chip set 32 and the switch unit 18 (18A, 18B) of the controller 16B are connected via PCI-Express 38B.

The switch LSI is an integrated circuit for switching the connection between the respective processor cores of the controller (FIG. 2), and the host I/F unit 20, the cache memory unit 22 or the disk I/F unit 24. The host I/F unit 20 sorts the write or read command from the host 12 to the controller 16, or realizes the data transfer between the host 12 and the cache memory unit 22 upon receiving a request from the controller 16.

The cache memory unit 22 temporarily stores user data or control data to be shared by the respective controllers 16. The disk I/F unit 24 receives a request from the controller 16 and executes the data transfer between the disk array unit 40 and the cache memory unit 22, or executes parity operation. The memory device is not limited to a hard disk drive, and may also be a semiconductor memory device such as a flash memory drive device.

Figure 3:
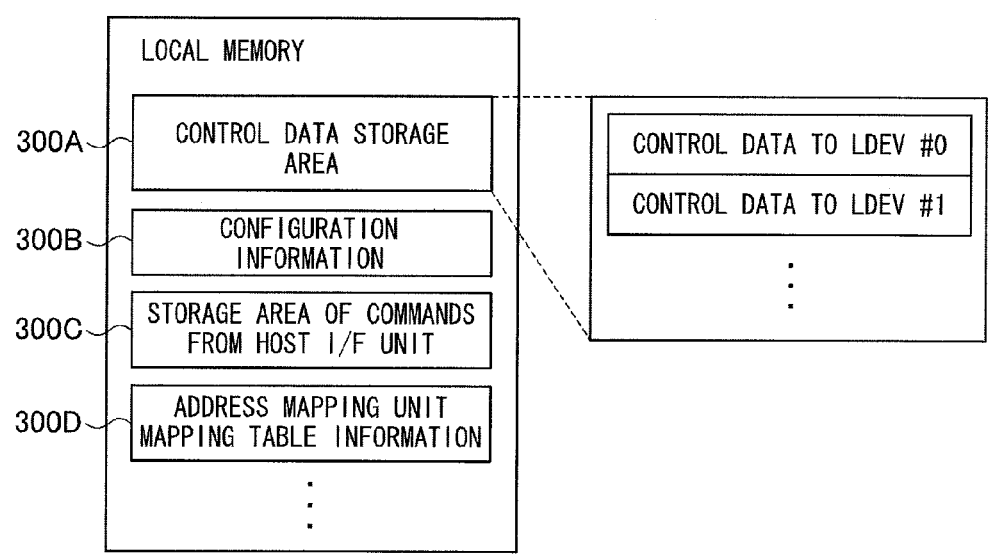
FIG. 3 is a block diagram showing a detailed configuration of a local memory unit of a controller.

FIG. 3 is a block diagram showing the detailed configuration of the local memory unit 30. The control data storage area 300A is an area for storing the control data of a logical volume (LDEV) allocated to the storage subsystem 10 and stores, for example, existence of cache data, address of the cache memory unit 22 storing the user data, LRU information (access history) of the cache data, and information for determining whether the cache data is clean data or dirty data.

The area 300B stores configuration information of the controlled unit in the storage subsystem, and the area 300C stores commands from the host I/F unit. The processor core that has the right to execute processing in response to the command processes the stored commands in order. The area 300D stores an address mapping table of the switch LSI, and information on the use history of the mapping table.

Figure 4:
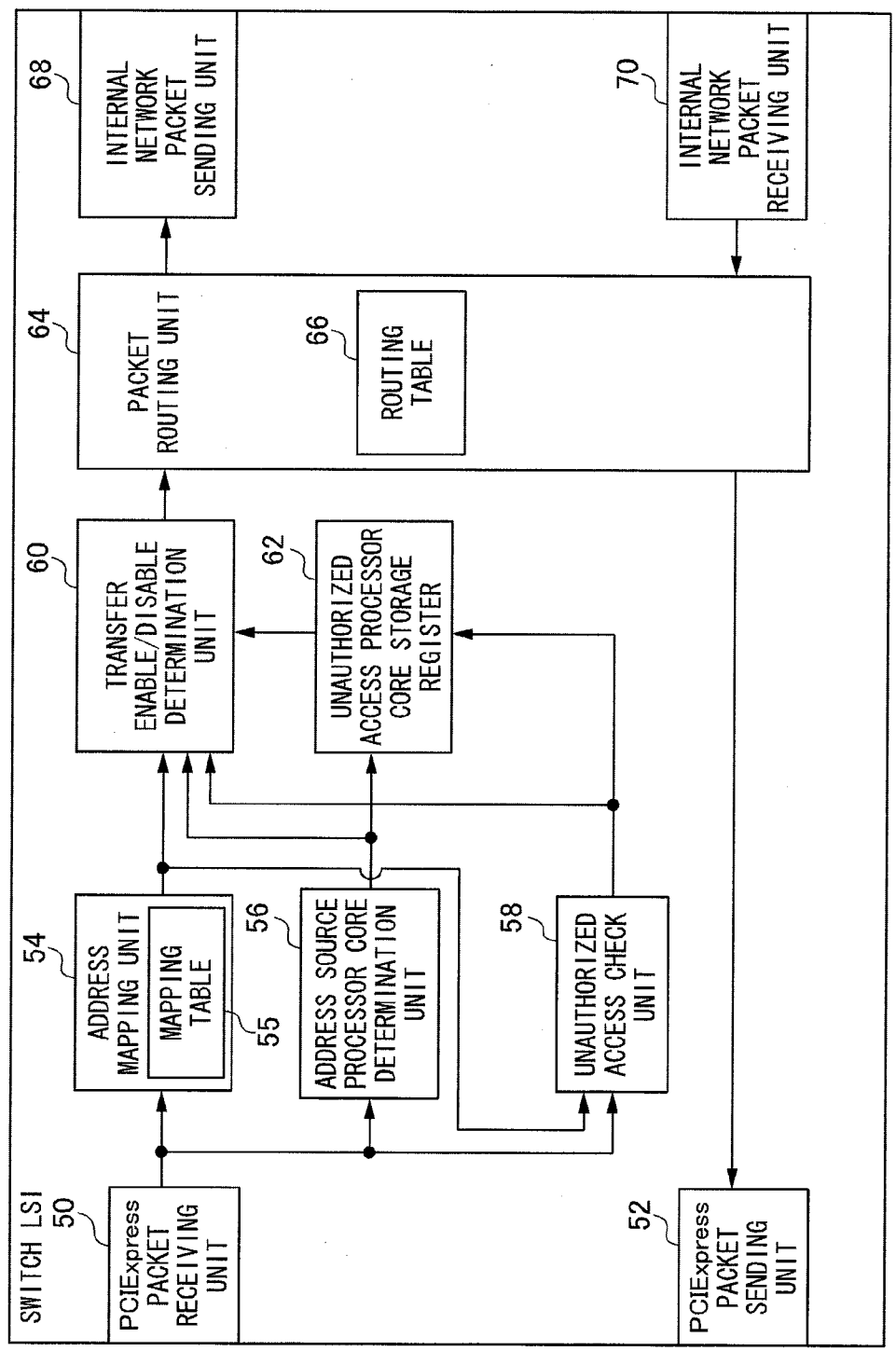
FIG. 4 is a block diagram showing a detailed configuration of a switch LSI.

FIG. 4 is a block diagram showing the detailed configuration of the switch LSI. The switch LSI comprises the respective elements illustrated in FIG. 4. A packet receiving unit (circuit) 50 receives a PCI-Express packet addressed from the controller 16 to the controlled unit. The packet sending unit 52 sends the PCI-Express packet from the controlled unit to the controller (circuit) 16.

The packet receiving unit 50 outputs the packet to an address mapping unit (circuit) 54, an access source processor core determination unit (circuit) 56, and an unauthorized access check unit 58 (circuit). The address mapping unit 54 comprises a mapping table for mapping a logical address contained in the packet and designated by the processor core to a real address applied commonly to the controlled unit.

The access source processor core determination unit 56 determines the access source processor core from the logical address designated by the processor core. The unauthorized access check unit 58 checks whether the access from the processor core is authorized or unauthorized according to the determination program.

The mapping result of the address mapping unit 54, the determination result of the access source processor core determination unit 56, and the check result of the unauthorized access check unit 58 are sent to the transfer enable/disable determination unit 60. In addition, the determination result of the access source processor core determination unit 56, and the check result of the unauthorized access check unit 58 are sent to the unauthorized access processor core storage register 62. Information of the unauthorized access processor core storage register 62 is sent to the transfer enable/disable determination unit 60 (circuit).

The unauthorized access processor core storage register 62 stores the processor core number that performed the unauthorized access. The transfer enable/disable determination unit 60 determines whether the packet is transferable from the determination result of the unauthorized access check unit 58 and the contents of the unauthorized access storage register 62.

The packet that the transfer enable/disable determination unit 60 deems transferable is sent to the packet routing unit 64. The packet routing unit (circuit) 64, in accordance with the routing table 66, delivers the packet data to the intended controlled unit via the internal network packet sending unit 68 based on the mapped destination address of the packet sent from the transfer enable/disable determination unit 60. The internal network packet sending unit 68 is connected to the internal network 26.

In addition, the packet routing unit 64 also comprises a function of routing the packet received from the internal network packet receiving unit 70 (circuit) to the processor core 28 of the controller 16. The packet routing unit 64 performs prescribed protocol conversion upon transferring data.

Figure 5:
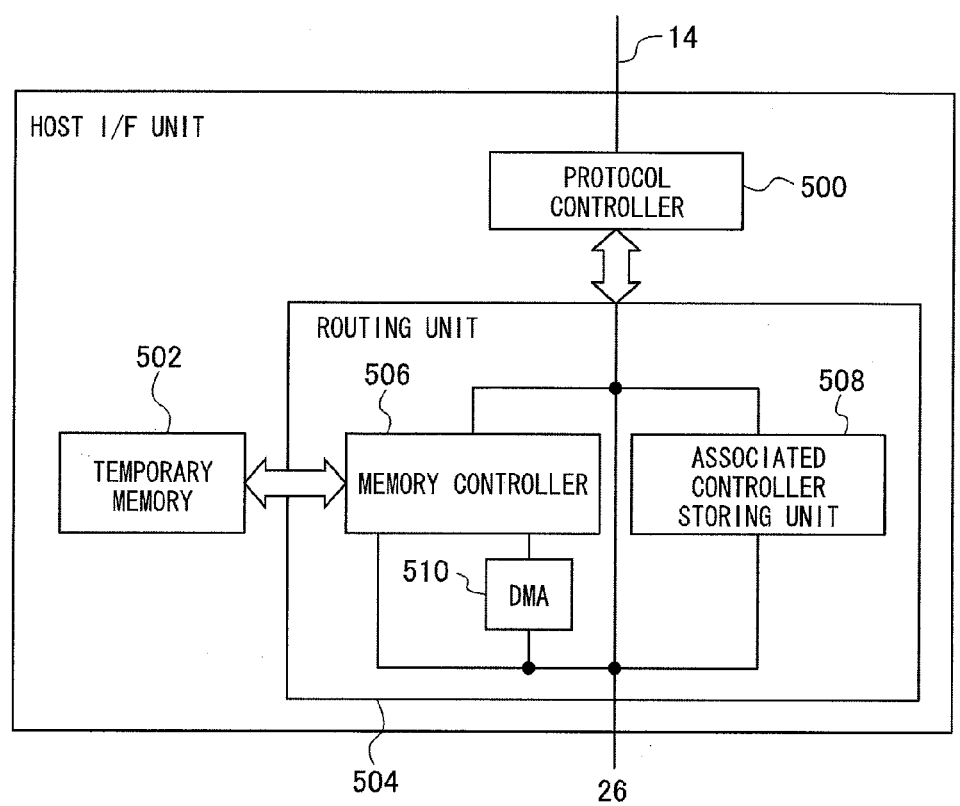
FIG. 5 is a block diagram showing the structure of a host I/F unit.

FIG. 5 is a block diagram showing the structure of the host I/F unit 20. The host I/F unit comprises a protocol controller 500, a routing unit 504, and a temporary memory 502. The protocol controller 500 is connected to the host apparatus 12 via the network 14. The routing unit 504 is connected to the internal network 26.

The protocol controller 500 performs the protocol conversion of data that is exchanged between the host apparatus 12 and the storage system 10. Specifically, the protocol controller converts the I/O requests as the external data from the host apparatus that was transmitted on the network 14 into internal data to be processed in the storage system, and converts the internal data to be sent to the host apparatus in response to the I/O request into external data that is suitable for transmission on the network 14.

The routing unit 504 comprises a memory controller 506, a DMA 510, and an associated controller sorting unit 508. The temporary memory 502 temporarily stores user data to be transferred between the cache memory unit and the protocol controller 500.

The memory controller 506 controls the temporary memory. The DMA 510 executes the data transfer between the cache memory unit 22 and the temporary memory 502. The associated controller sorting unit 508 decides the controller to be in charge of processing the write/read command sent from the host apparatus based on the routing table, and sends the command to the local memory 30 of the decided controller.

Figure 6:
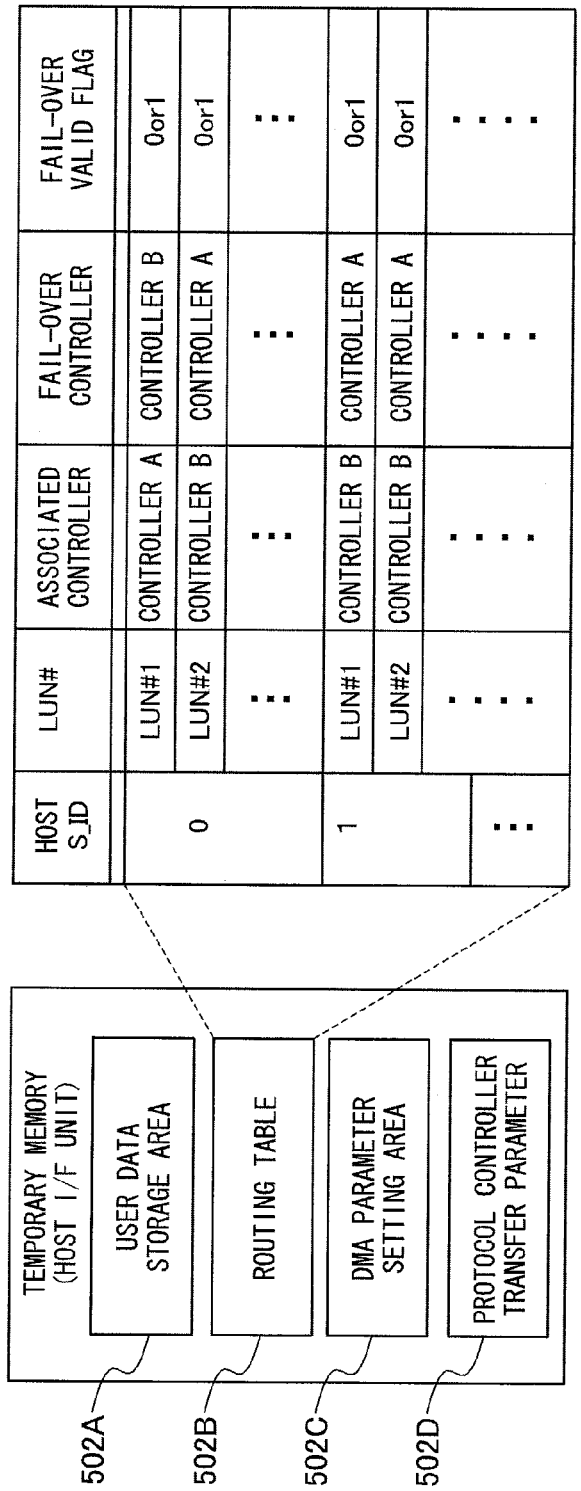
FIG. 6 is a block diagram of a temporary memory.

FIG. 6 is a block diagram of the temporary memory 502. The temporary memory comprises a user data storage area 502A, a routing table setting area 502B, a DMA parameter setting area 502C, and a protocol controller transfer parameter setting area 502D.

The routing table comprises routing information for the associated controller sorting unit 508 to identify the command destination. The routing table has a host S_ID (Source ID: N_Port address identifier of the frame sender), and a LUN (Logical Unit Number).

The disks configuring the disk array device 40 are partitioned logically, and the partitioned sections may be respectively set to different RAID levels. This section is a RAID group. An area, which is a SCSI access unit, obtained by further partitioning the RAID group logically is an LU (Logical Unit), and each area has a LUN.

The "associated controller" registers the identifier of a controller to process the commands to the logical storage area identified from the host S_ID and the LUN. The "fail-over controller" registers the identifier of another controller to take over the command processing if the associated controller becomes a failure status. The "fail-over control valid flag" stores information on whether the fail-over controller is to be in charge of the command processing.

The DMA parameter setting area 502C comprises the necessary parameters (address, transfer length, write or read command, etc.) required for the DMA 510 to transfer data from the temporary memory 502. The protocol controller transfer parameter setting area 502D comprises parameters for the protocol controller 500 to transfer user data between the host apparatus 12 and the temporary memory 502. As a result of the processor core setting the parameters in the protocol controller 500, the protocol controller reads such parameters and transfers user data.

Figure 7:
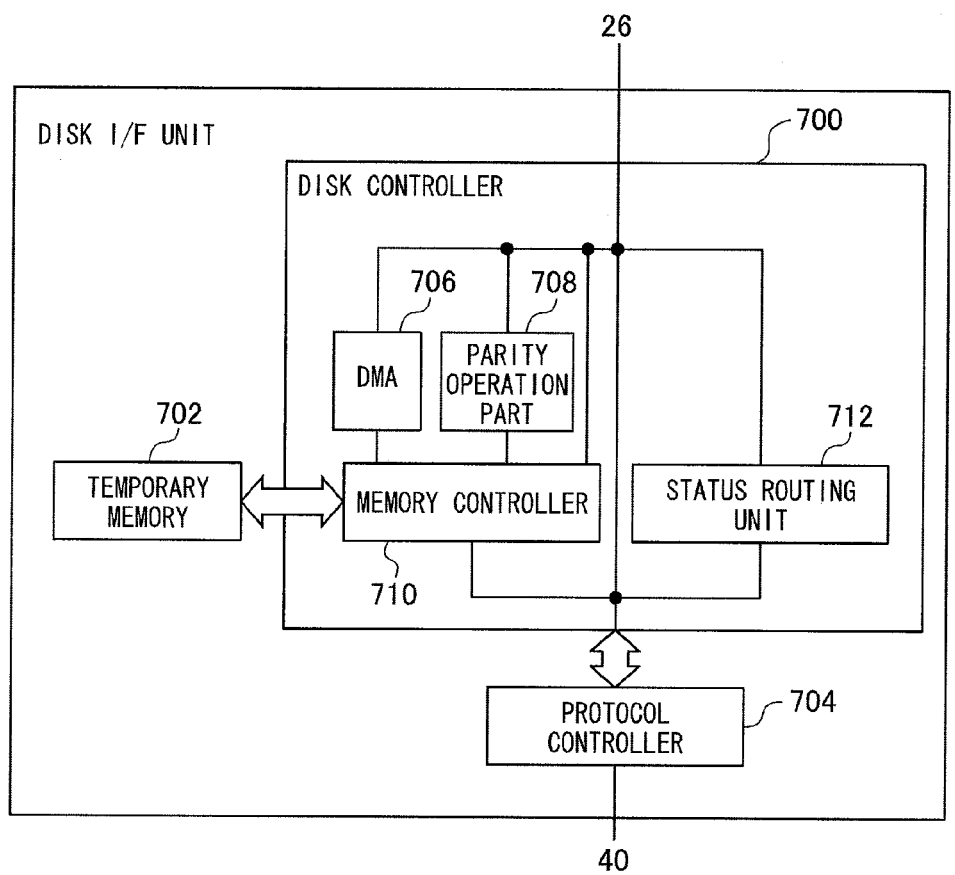
FIG. 7 is a block diagram of a disk I/F unit.

FIG. 7 is a block diagram of the disk I/F unit 24. The disk I/F unit 24 comprises a disk controller 700, a temporary memory 702, and a protocol controller 704. The disk controller 700 is connected to the internal network 26. The disk controller 700 is connected to the disk array unit 40 via the protocol controller 704.

The protocol controller 704 performs the protocol conversion of data with the disk array unit 40. The temporary memory 702 temporarily stores user data to be transferred between the cache memory unit 22 and the protocol controller 704. The memory controller 710 controls the temporary memory 702. The DMA 706 transfers data between the cache memory unit 22 and the temporary memory 702. The parity operation part 708 performs the parity operation of RAID 5, RAID 6 or the like to the data stored in the disk array unit 40.

The status routing unit 712 determines the associated controller 16 from the information contained in the status information sent from the protocol controller 704, and transfers the status information to the local memory 30 of the associated controller.

Figure 8:
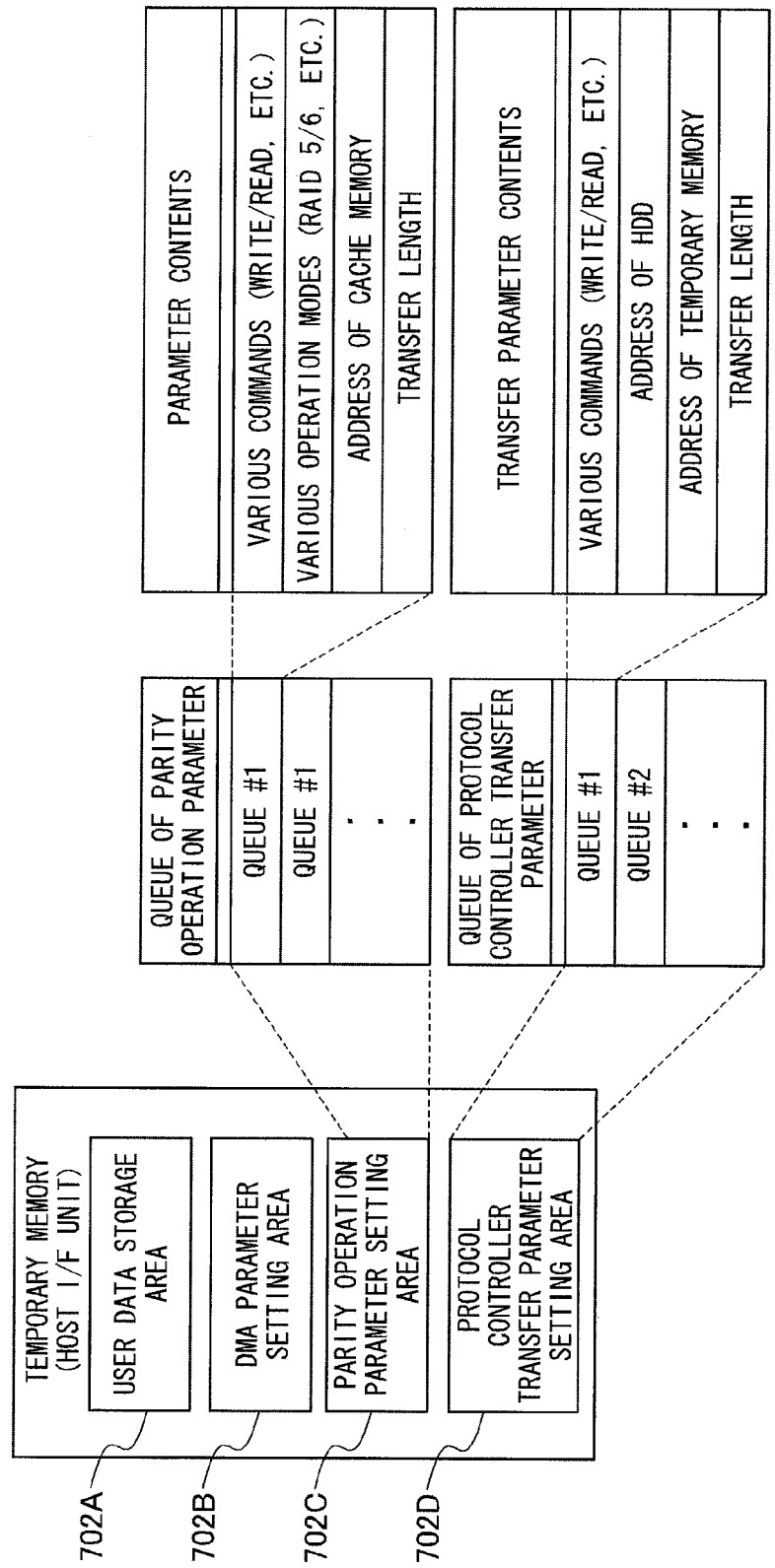
FIG. 8 is a block diagram of a temporary memory.

FIG. 8 is a block diagram of the temporary memory 702. The temporary memory comprises a user data storage area 702A, a DMA parameter setting area 702B, a parity operation parameter setting area 702C, and a protocol controller transfer parameter setting area 702D.

The parity operation parameter setting area 702C is configured from a queue structure of the parity operation parameter, and the parity operation parameter of each queue is information required for the parity operation and includes various commands (write/read, etc.), various operation modes (parity type of RAID 5/6), address of area storing new/old data, storage destination address of new/old parity, address of the cache memory unit to which data is to be transferred, transfer length, and the like.

The protocol controller transfer parameter setting area 702D is configured from a queue structure of the protocol control parameter. Each queue is configured from various commands (read/write, etc.), address of the HDD, address of the temporary memory 702, and transfer length.

Figure 9:
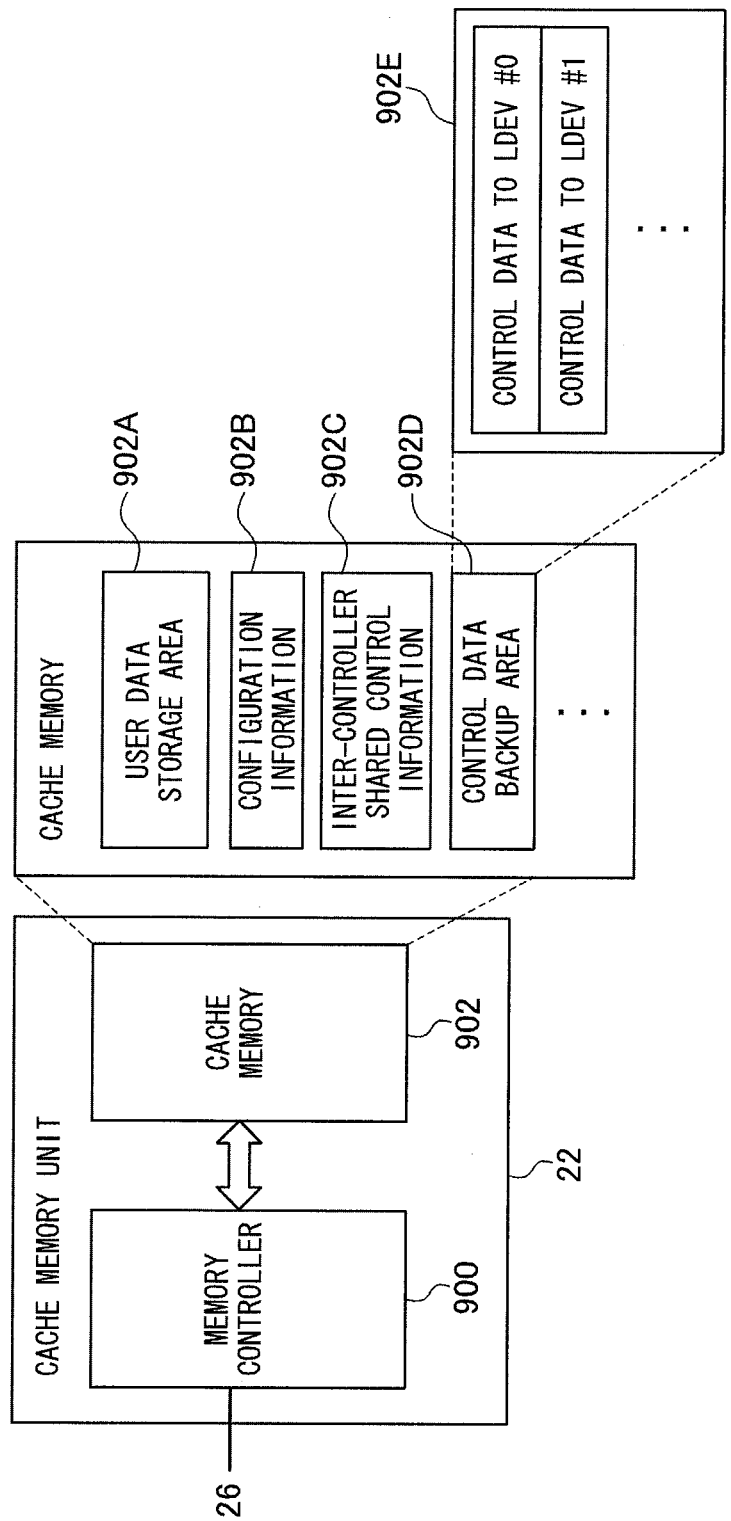
FIG. 9 is a block diagram showing the structure of a cache memory unit.

FIG. 9 is a block diagram showing the structure of the cache memory unit 22. The cache memory unit comprises a memory controller 900 and a cache memory area 902. The memory controller 900 performs control for receiving an access request from another unit of the storage subsystem 10, and accessing the appropriate area of the cache memory 902.

The cache memory area 902 comprises a user data storage area 902A, configuration information 902B, inter-controller shared control information 902C, and a control data backup area 902D.

The control data backup area 902D is an area required in cases where a failure occurs in a certain controller 16 and another controller is to take over the processing handled by the failed controller. Here, backup data of the control information of the local memory unit 30 is stored. The control data backup area stores control data 902E for each logical volume.

The inter-controller shared control information 902C is control information to be shared among a plurality of controllers. This includes information required for the storage service to be jointly provided by a plurality of controllers.

Figure 11:
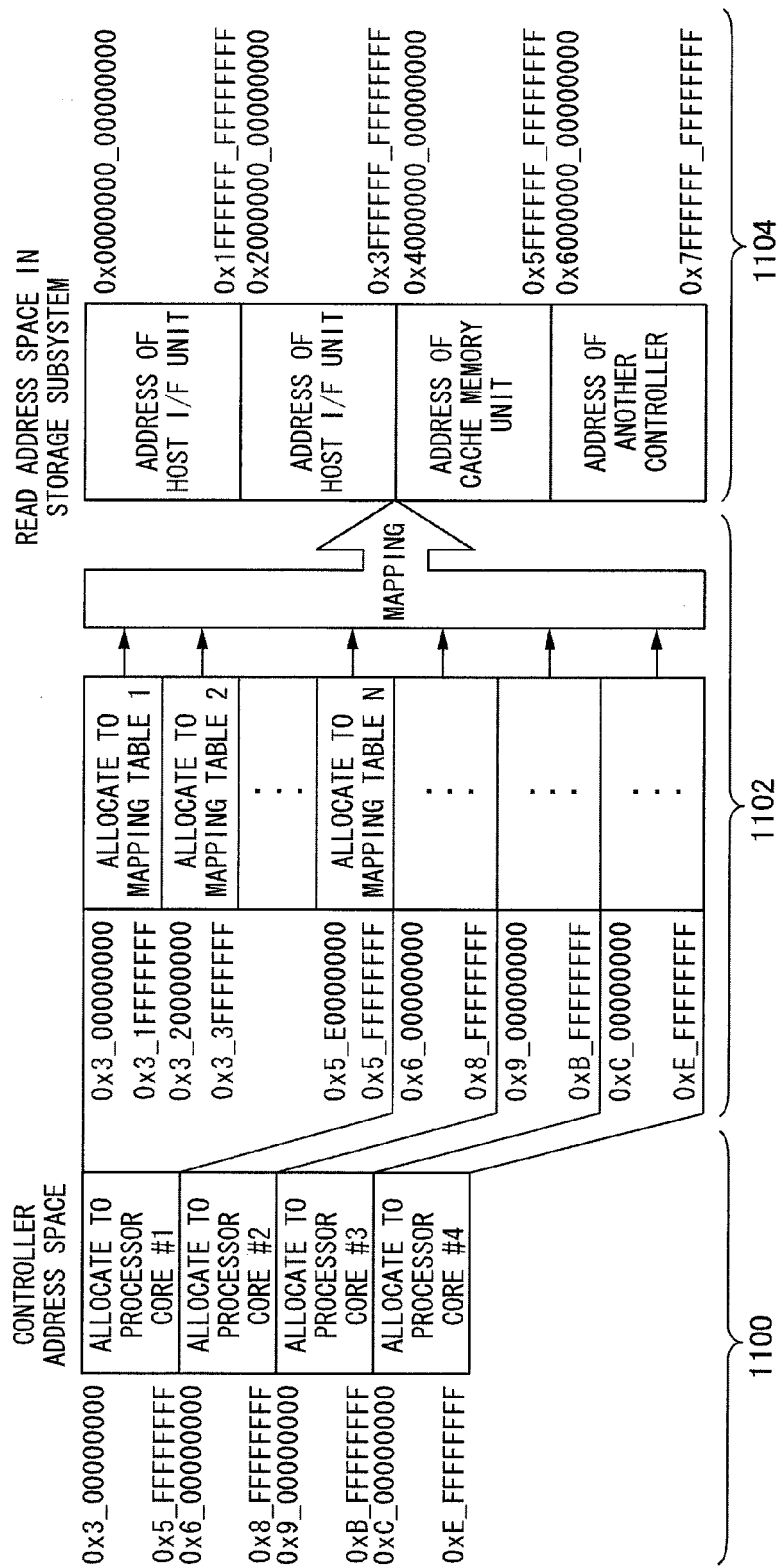
FIG. 11 is a block diagram showing the principle of address mapping processing.

The address mapping to be performed by the address mapping unit 54 (FIG. 4) of the switch LSI is now explained. FIG. 11 is a block diagram showing the principle of the address mapping processing. The address mapping processing is processing of the mapping means 1102 mapping an address belonging to the address space 1100 of the controller to an address belonging to the real address space 1104 of the storage subsystem.

A real address space is commonly applied to control units such as the host I/F unit 20, the cache memory 22, and the disk I/F unit 24 that receive control from the controller. Meanwhile, a virtually set address space that is different from the real address space, such as according to the PCI-Express standard, is applied to the controller.

For instance, the address of the host I/F unit is in the range of 0x0000000_00000000 to 0x1FFFFFFF_FFFFFFFF.

Similarly, the address of the disk I/F unit, the address of the cache memory unit and the address of another controlled unit are as shown in FIG. 11. Accordingly, a real address is allocated for each unit.

Meanwhile, in the case of controllers, a virtual address is allocated for each processor core. For example, an address of 0x3_00000000 to 0x5_FFFFFFFF is allocated to the processor core □1. When the processor core is to output a packet to the switch LSI 18, it selects an address within the foregoing range and loads the packet. The addresses allocated to the other processor core are as shown in FIG. 11.

The mapping processing 1102 realized by the address mapping unit 54 maps the virtual address of the controller to a real address based on a mapping table. The mapping table is allocated for each processor core, and also allocated for each virtual address of the processor core. For example, the mapping table 1 is allocated to the address range of 0x3_00000000 to 0x3_1FFFFFFF regarding the processor core □1, and the mapping table 2 is allocated to the address range of 0x3_20000000 to 0x3_3FFFFFFF. Subsequently, the mapping table 3 onward are allocated equally to the address range of the controller. Since the plurality of processor cores respectively use a different logical address, the mapping table is also different for each processor core. The difference in the mapping tables is the setting value used in the mapping from the virtual address to the real address.

When the address mapping unit 54 receives a packet from the controller, it determines the address contained in the packet, applies the setting value of the corresponding mapping table to this address and seeks the real address, and changes the address of the packet into a real address.

When the controller is to access the intended read address in the real address space, it decides the mapping table and a specific virtual address so the virtual address will become a real address after mapping, adds a specific virtual address to the pack from the processor core to which this specific address has been allocated, and outputs this packet to the switch LSI.

As described above, the mapping table exists in correspondence with the virtual address of the controller, and comprises a setting value for mapping the virtual address to a real address. FIG. 10 is a table showing an example of a mapping table. In this example, a specific value of a real address is set in the mapping table. For instance, table 1 is for the processor core □1, and (0x1000000_400000000) as a part of the address of the host I/F unit is set therein. In addition, table 2 is also for the processor core □1 as with table 1, and (0x2000000_400000000) as a part of the address of the host I/F unit is set therein. Table 3 is also for the processor core □1, and (0x4000040_800000000) as a part of the address of the cache memory unit is set therein. This table is registered as the address mapping unit mapping table information (FIG. 3) in the local memory unit 30.

Figure 12:
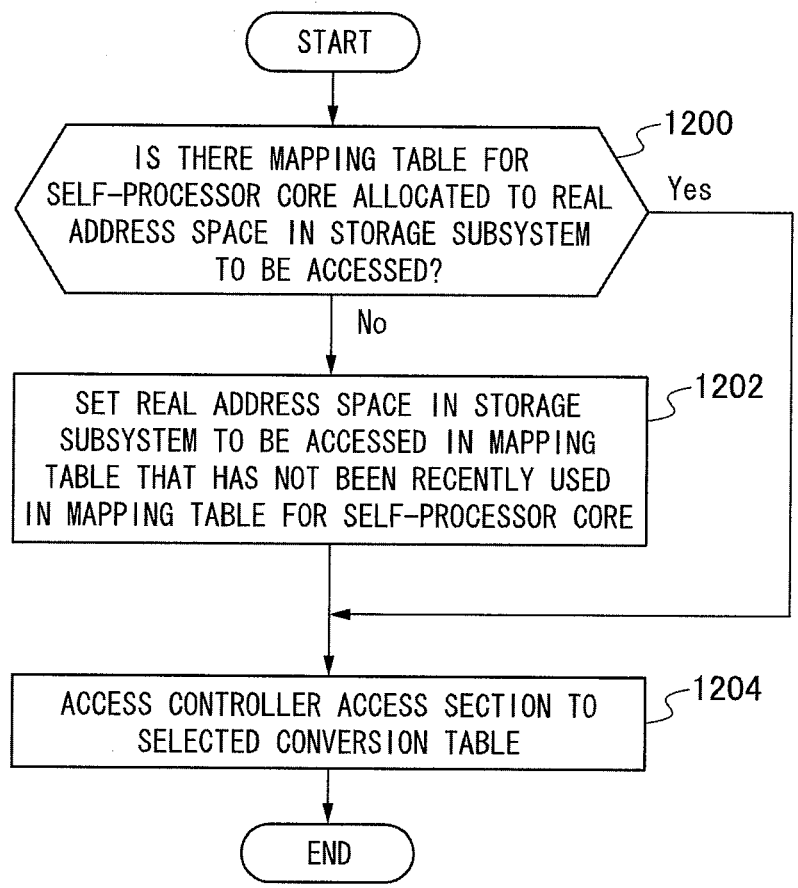
FIG. 12 is a flowchart showing an access issue operation of a controller.

The processing of address mapping is now explained with reference to the flowcharts. FIG. 12 shows the operation of the controller 16. Among the plurality of processor cores of the associated controller that read a command from the host I/F unit 12, the processor core that initially received the command refers to the address mapping unit mapping table information (FIG. 3) of the local memory unit 30, and checks whether there is a mapping table that has been allocated to the real address space to be accessed (1200). For example, in a case where the processor core □1 is the processor core to process the write command and the access destination is the real address of 0x1000000_40000000 to 0x 1000000_5FFFFFFF of the host I/F unit 20, the processor core □1 determines the existence of table 1 (FIG. 10), and affirms step 1200.

Subsequently, the processor core □1 selects the optimal virtual address from the virtual address range allocated to table 1, and uses this optimal virtual address to access the switch LSI (1204).

The real address to be accessed by the processor core is decided uniquely. A base address is set in the setting value of the table. For example, if the real address to be accessed is 0x201235_6789abcd, 0x2012345_60000000 is set in the mapping table. Moreover, for example, if this value is set in a table, the virtual address will be 0x3_0789abcd.

Meanwhile, at step 1200, if the processor core □1 determines that there is no table that has been allocated to the real address space to be accessed; for example, if the processor core #1 has no mapping table allocated to the read address of the disk I/F unit 24, the processor core #1 proceeds to step 1202, selects a table with the lowest important among the mapping tables allocated for the self-processor core, and rewrites the setting value of this table with a prescribed real address of the memory area of the disk I/F unit. For instance, the processor core selects the table with the oldest access history from the address mapping unit 54 of the switch LSI regardless of which real address this table has as the setting value. The processor core records the access history to the mapping table in the address mapping unit mapping table information storage area (300D) of the local memory unit 30. The processor core #1 thereafter accesses the switch LSI using the virtual address allocated to the selected mapping table.

Figure 13:
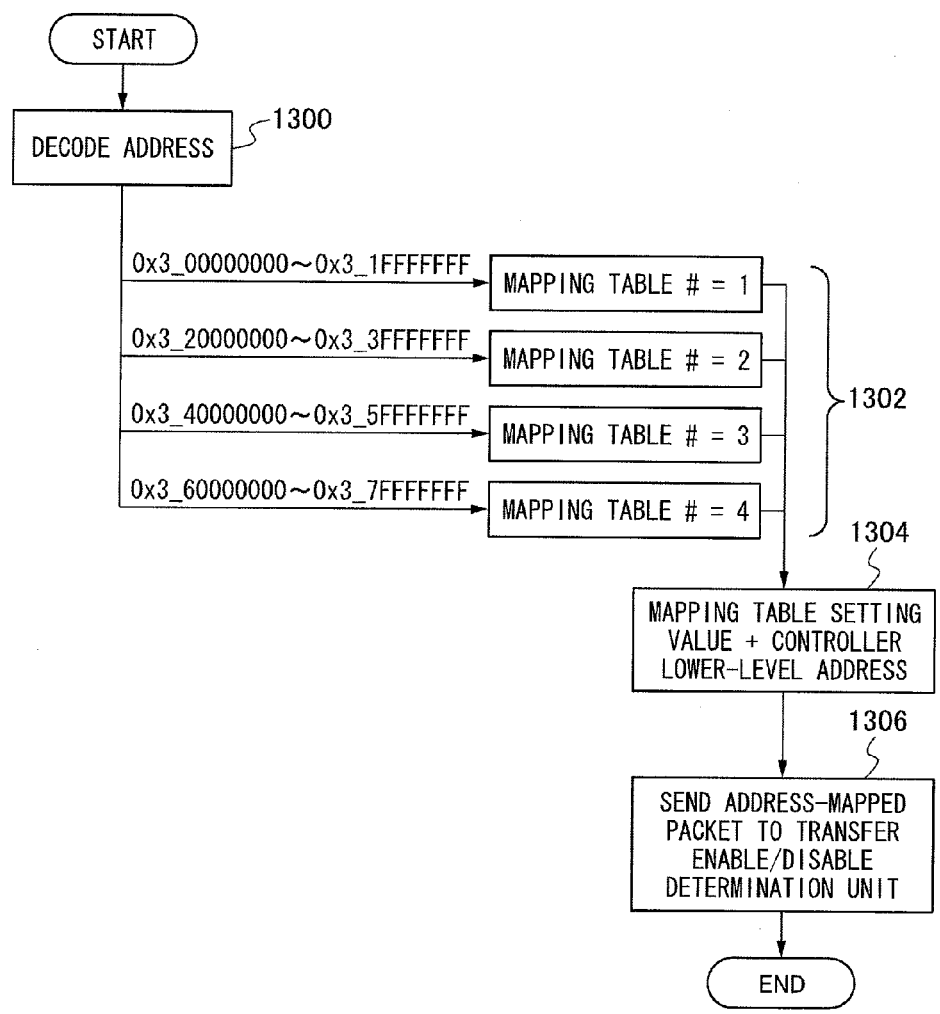
FIG. 13 is an operation flowchart of an address mapping unit of a switch LSI.

FIG. 13 is an operation flowchart of the address mapping unit 54 of the switch LSI. The address mapping unit 54 decodes the address of the virtual packet received from the controller (1300), and selects the mapping table allocated to the decoded address (1302).

Subsequently, the address mapping unit perform address mapping based on the selected mapping table. For example, a lower-level address (such as "0x1FFFFFFF" of 0x3_1FFFFFFF) of the packet sent from the controller is added to the setting value of the selected mapping table (1304). Since a part of the address of the real address space to which the packet is to be sent is set in the setting value of the mapping table, by adding the decoded address to this setting value, the switch LSI is able to send the packet to the intended real address. Subsequently, the address mapping unit 54 sends the address-mapped packet to the transfer enable/disable determination unit 60 (1306).

Figure 14:
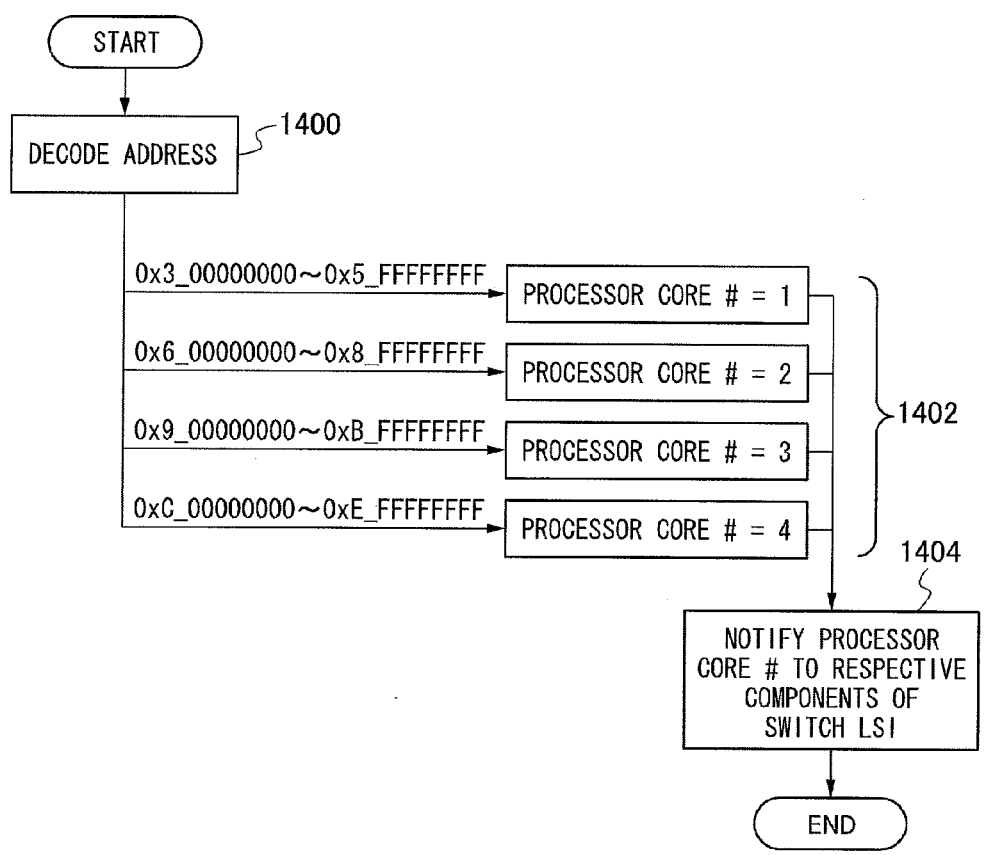
FIG. 14 is a flowchart for identifying the processor core that sent a packet of a switch LSI.

The access source processor core determination unit 58 of the switch LSI identifies the processor core that sent the packet. FIG. 14 is a flowchart showing this process. When the determination unit receives a packet, it decodes the address of that packet (1400). As shown in FIG. 11, since the virtual address of the controller is allocated so that it does not overlap in a plurality of processor cores, the determination unit is able to determine the processor core that sent the packet from the decoded address (1402).

The allocation information exists in the switch LSI. This is because, assuming that such allocation information exists in a local memory unit, the processor core will need to refer to the local memory for each access of the switch LSI.

Moreover, the determination unit 56 notifies the identifying information of the identified processor core to the transfer enable/disable determination unit 60 of the switch LSI and the unauthorized access processor core register 62 (1404). As described above, the switch LSI is able to identify the processor core that sent the packet among the plurality of processor cores of the controller.

Even with a different controller, the same virtual address space is applied to the plurality of controllers, and the access source processor core determination unit 56 is able to differentiate the controllers from the difference in the path with the controllers. Thus, the determination unit 56 is able to differentiate the plurality of processor cores from the difference in the packet address across a plurality of controllers.

Figure 15:
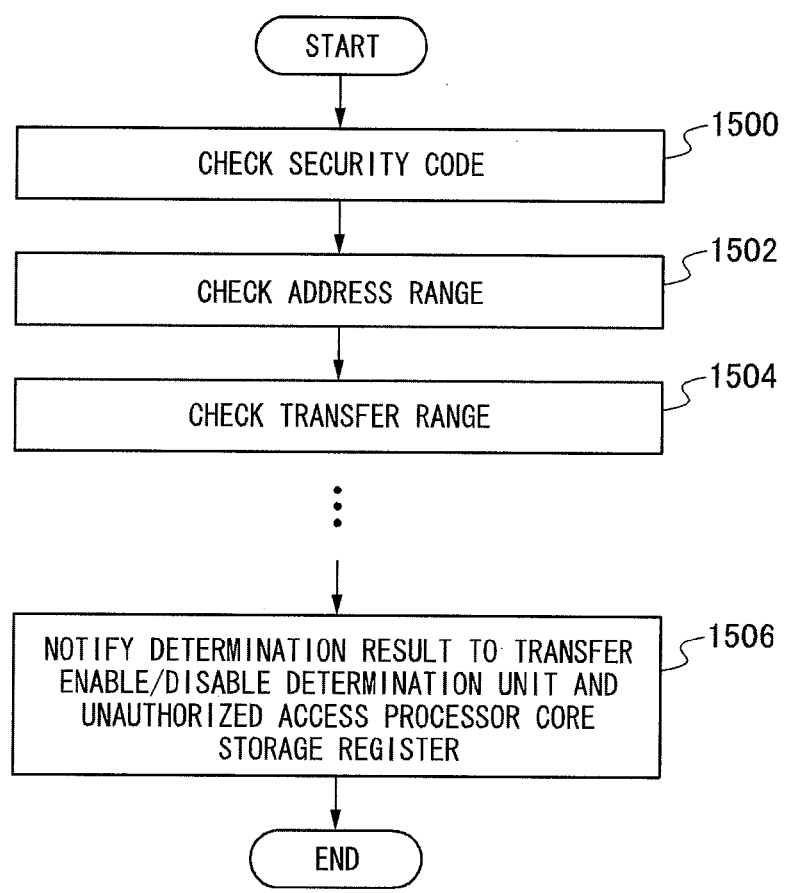
FIG. 15 is a flowchart showing an operation for an unauthorized access check unit to check whether a packet received from a controller is an unauthorized access.

The unauthorized access check unit 58 checks whether the packet received from the controller is an unauthorized access. The operation flowchart is now explained with reference to FIG. 15. The determination unit 60 checks the security code of the packet (1500). A security code is a code (LRC or the like) for securing the address or data, and is created with a program.

Subsequently, the unauthorized access check unit 58 receives the real address mapped with the address mapping unit 54, and checks whether the address belongs to a prescribed range (1502). Moreover, the check unit 58 checks the transfer length of the packet (1504). The check unit 58 may also thereafter determine the status of unauthorized access based on other parameters. If the check unit 58 detects an abnormality in at least one of the parameters, it determines that the access was unauthorized. The unauthorized access check unit 58 notifies the determination result showing whether the access was authorized or unauthorized to the transfer enable/disable determination unit 60 and the unauthorized access processor core storage register 62 (1506).

Figure 16:
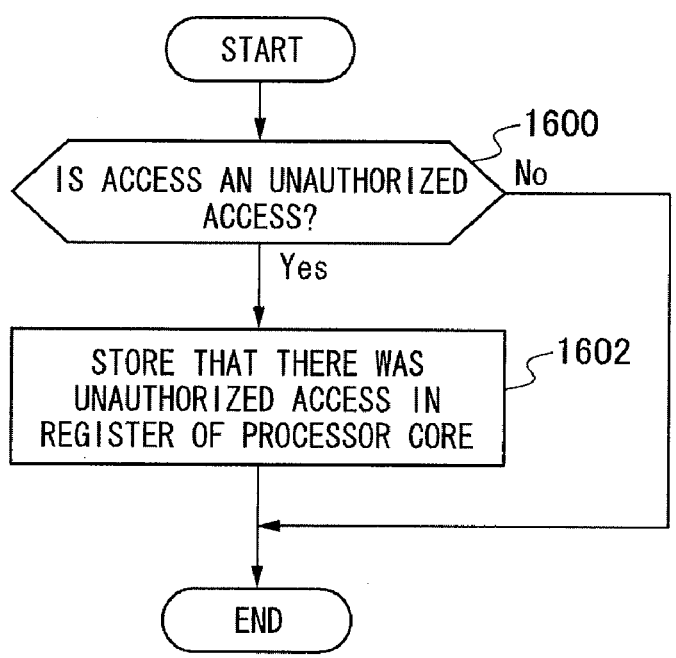
FIG. 16 is an operation flowchart of an unauthorized access processor core storage register.

FIG. 16 is an operation flowchart of the unauthorized access processor core storage register 62. The storage register determines whether the notice from the unauthorized access check unit 58 indicated an unauthorized access (1600). If it is not an unauthorized access, the storage register ends the processing. Meanwhile, if it is determined as an unauthorized access, the storage register refers to the determination result from the access source processor core determination unit 56, and sets and stores a flag showing the detection of an unauthorized access in the register area corresponding to the processor core as the unauthorized access source (1602).

Figure 17:
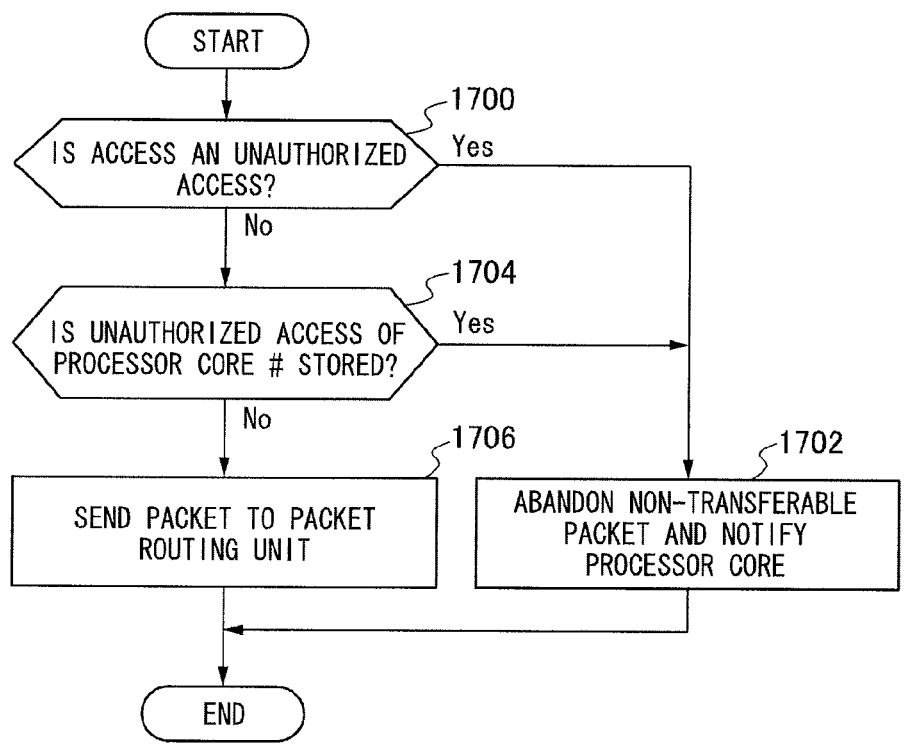
FIG. 17 is an operation flowchart of a transfer enable/disable determination unit.

FIG. 17 is an operation flowchart of the transfer enable/disable determination unit 60. The determination unit 60 determines the status of an unauthorized access by receiving the determination result from the unauthorized access check unit 58 (1700). If an unauthorized access is determined, the determination unit determines that the packet cannot be transferred, abandons the packet, and notifies the access source processor core that the packet has been abandoned (1702).

If the determination unit obtains a negative determination at step 1700, it refers to the unauthorized access processor core storage register, and checks whether a flag showing unauthorized access is set in the access source processor core (1704). If it is determines that a flag showing unauthorized access has been set, the determination unit proceeds to step 1702 even if the access is authorized, and abandons the packet.

The reason why the enable/disable determination unit 60 cuts off this access even if the switch LSI registers the processor core that issued the unauthorized access in the register 62 and subsequent access from the processor core is normal is explained below.

For instance, there are cases where a certain processor core sets transfer parameters in the temporary memory 502 of the host I/F unit 20, starts up the protocol controller 500 in the subsequent access, reads the transfer parameters, and transfers data from the host I/F unit to the host apparatus 12 based on the read parameters.

Figure 24:
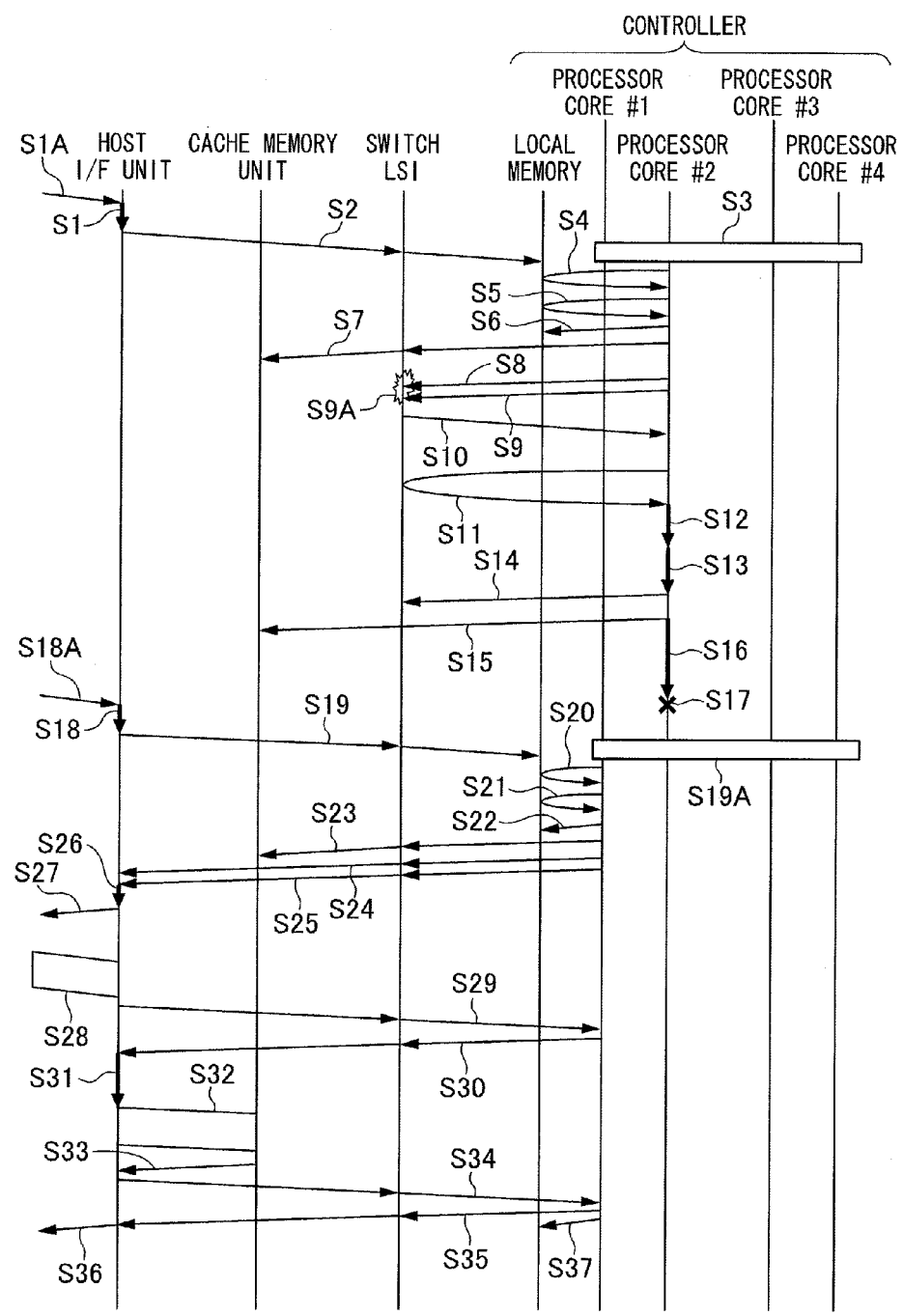
FIG. 24 is a sequence flowchart showing an operation of a storage subsystem when a failure occurs in a processor core.

During this period, after the access of setting the transfer parameters in the temporary memory 502 of the host I/F unit 20 is determined to be unauthorized, if the switch LSI permits the subsequent access, data will be transferred to the host apparatus according to the old transfer parameters. Thus, the switch LSI does not allow accesses subsequent to an access determined to be unauthorized. This is also shown in FIG. 24 described later.

To continue the explanation by returning to FIG. 17, the access (packet) subject to a negative determination at step 1704 is sent as a normal packet to the packet routing unit (1706).

FIG. 18 shows a representative example of an access among a plurality of components via the switch LSI. As described above, FIG. 18 shows specific examples of access from the controller (processor core) to the controlled unit.

Figure 19:
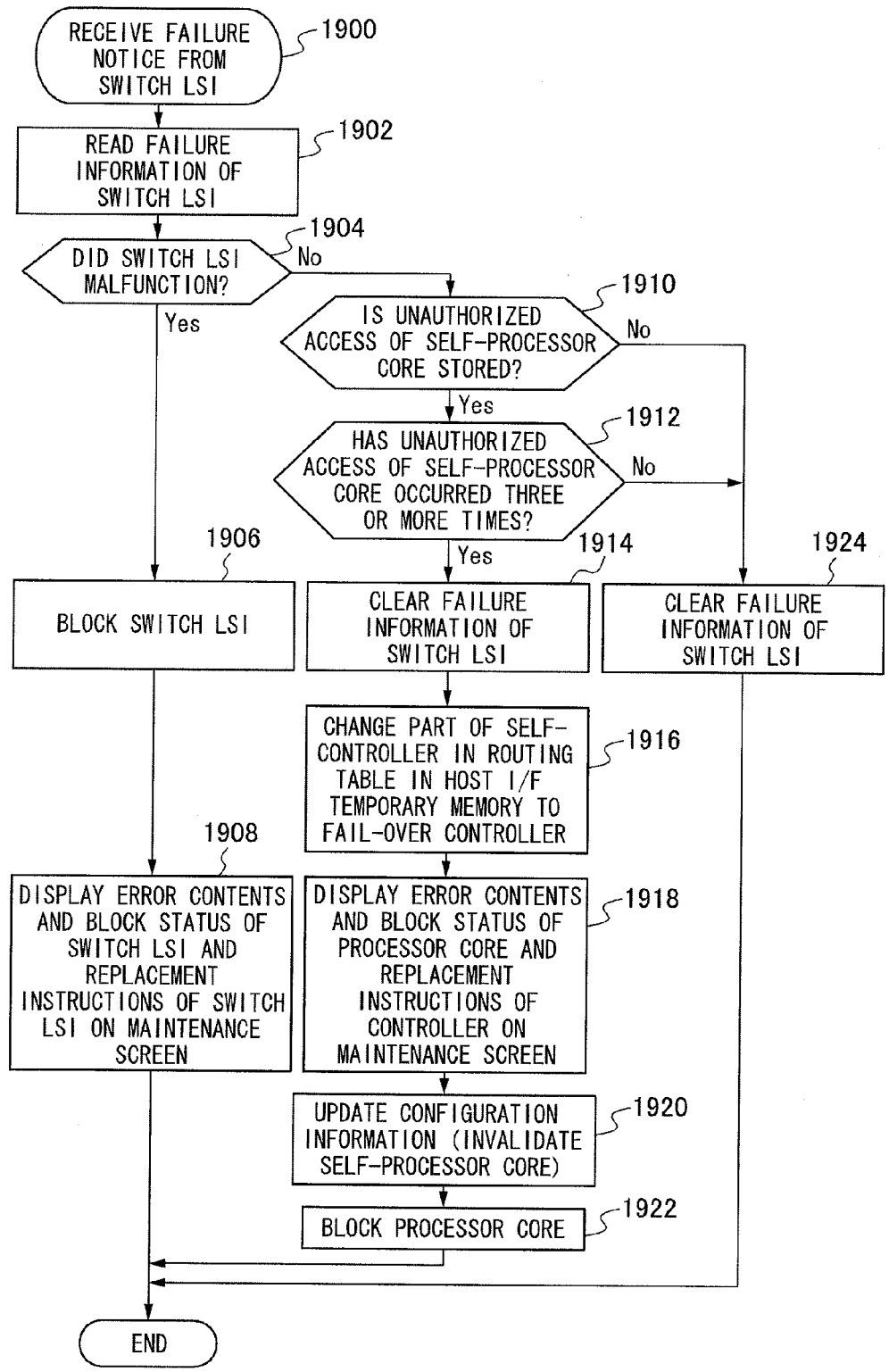
FIG. 19 is a flowchart explaining failure processing of a controller.

FIG. 19 is a flowchart showing the failure processing of the controller. The processor core belonging to the controller that received the failure notice from the switch LSI executes the flowchart of FIG. 19.

If a failure occurs in the switch LSI, failure information is set in the switch LSI, and the processor core receives a failure notice from the switch LSI (1900). The flowchart is started based on this notice.

Subsequently, the processor core reads the failure information of the switch LSI (1902). The failure information includes information stored in the unauthorized access processor core storage register described above, as well as failure information of the switch itself.

Subsequently, the processor core determines the contents of the failure information of the switch LSI (1904). If the failure information indicates that it is a malfunction of the switch LSI, the processor core performs processing for blocking the switch LSI (1906). The processor core thereafter displays the error contents (type and location of switch LSI malfunction) on a maintenance screen of a maintenance apparatus of the storage subsystem, and then displays the block status of the switch LSI and a message urging the replacement of the switch LSI (1908).

If it is determined at step 1904 that the failure information of the switch LSI does not indicate the malfunction of the switch LSI, the processor core refers to information of the unauthorized access processor core storage register 62, and checks whether the information of the register is directed to itself (1910).

If the processor core determines that the failure information is not directed to the self-processor, it clears the set failure information of the switch LSI (1924). The processor core thereafter determines that there are no blocked sections and ends the flowchart.

Meanwhile, if it is determined at step 1910 that the unauthorized access of the self-processor is stored, the processor core determines whether the total number of unauthorized accesses of the self-processor core is three or more (1912). A total sum counter for counting the occurrence of an unauthorized access exists per processor core in the unauthorized access processor core storage register 62. If the total number of unauthorized accesses of the self-processor core is less than three, the processor core determines that there are no blocked sections and ends the sequential processing (1924).

Meanwhile, if the total number of unauthorized accesses of the self-processor core is three or more, this processor core is blocked, and, since the controller having this processor core will be replaced, foremost, as with step 1924, the failure information (unauthorized access processor core storage register) of the switch LSI is cleared.

Moreover, the processor core changes a part of the self-controller (controller to which the self-processor core belongs) in the routing table in the temporary memory of the host I/F unit to a fail-over controller (1916).

Specifically, in the routing table shown with reference numeral 502B in FIG. 6, if all self-controllers are failed over to a prescribed controller, the load will be concentrated on the processor core that was subject to the fail-over. Thus, in order to balance the load of the processor core, certain self-controllers among the plurality of self-controllers in the routing table are failed over to other controllers.

In the foregoing case, the self-controller continues the write/read processing to certain logical volumes without change. Here, as explained later, since the processor core that issued an unauthorized access will be blocked, the other processor cores that were not blocked will continue the various types of processing as the self-controller. In the routing table, to what degree the self-controller is to be subject to a fail-over is decided from the perspective of balancing the load of the normal processor cores (multiple) of the self-controller and other controllers.

Subsequently, the processor core displays the error contents, the block status of the processor and the replacement instructions of the self-controller on the maintenance screen (1918). Further, the processor core updates the configuration information existing in the local memory unit 30 of the self-controller, disables the self-processor core (1920), and additionally blocks the self-processor core (1922).

Although information of the unauthorized access processor storage register 62 is cleared at step 1914, in the least, access immediately after the determination of unauthorized access is blocked by the transfer enable/disable determination unit. FIG. 24 explains such blockage.

Figure 20:
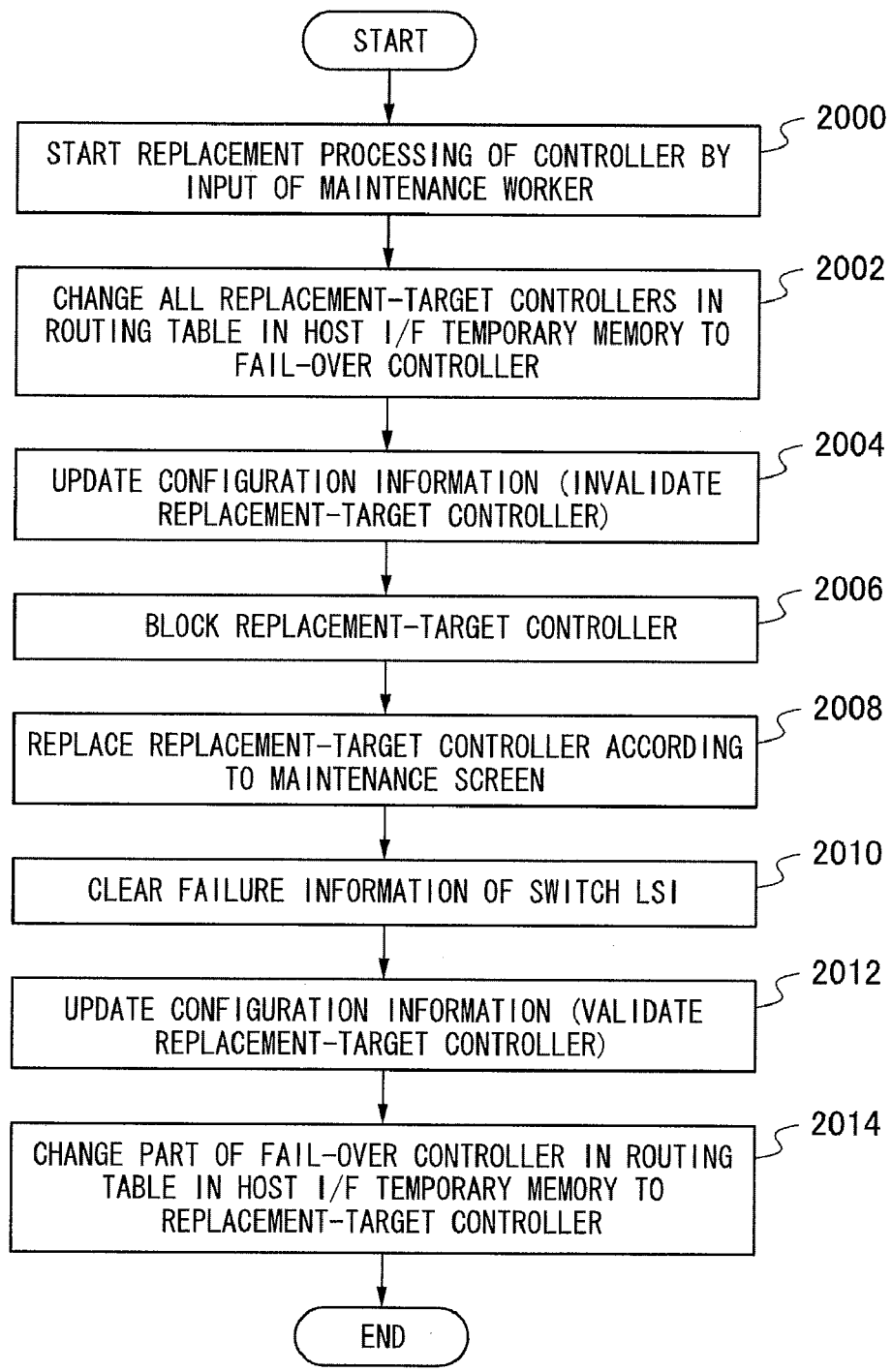
FIG. 20 is a flowchart explaining processing for replacing a controller.

FIG. 20 is a flowchart explaining the processing for replacing the controller. Pursuant to an input from a maintenance worker to a maintenance terminal, processing for replacing the controller is started (2000).

Subsequently, the processor core that started the replacement processing program pursuant to the input from the maintenance worker switches all controllers to be replaced in the routing table in the temporary memory 502 of the host I/F unit 20 to predetermined controllers (2002).

Subsequently, the processor core updates the configuration information in the cache memory unit and disables the replacement-target controller (2004), and thereafter blocks the controllers to be replaced (2006). The processor core further displays a message on the maintenance screen to the effect of replacing the replacement-target controller, and, after the replacement of the controller by the maintenance worker is complete (2008), it clears any failure flag remaining the unauthorized access control storage register regarding the processor core belonging to the replacement-target controller (2010). The configuration information of the local memory unit is obtained by identifying the information that is periodically read by the processor core from the cache memory.

Moreover, the program updates the configuration information and enables the replaced controller as a fail-over controller (2012), and then changes the replacement-target controllers remaining in the routing table in the temporary memory of the host I/F unit without being failed over to other controllers to prescribed controllers, and then ends the sequential operation (2014).

FIG. 21 shows an example of a maintenance screen. For each logical device number, an associated controller to perform the write/read processing to the logical device is shown.

Figure 23A:
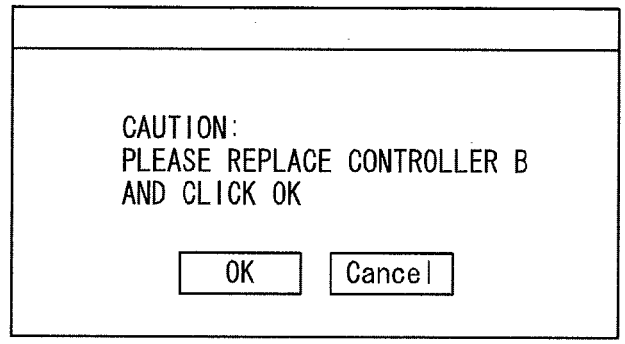
FIG. 23A is yet another example of a maintenance screen.
Figure 23B:
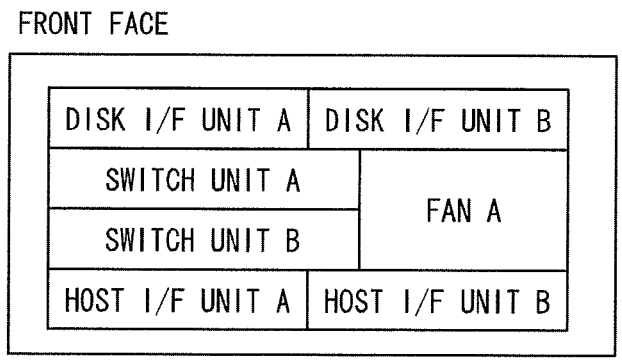
FIG. 23B is another example of a maintenance screen representing block information of a storage subsystem.
Figure 23C:
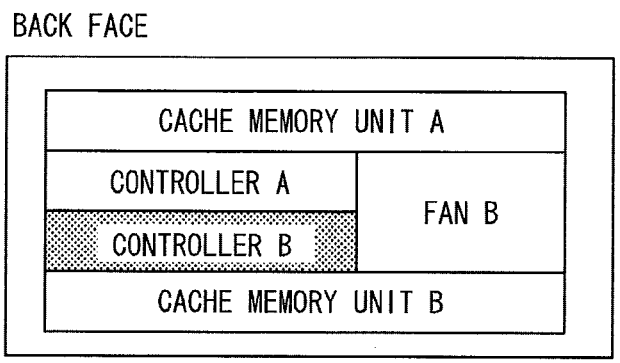
FIG. 23C is another example of a maintenance screen.

FIG. 22 shows another example of a maintenance screen. The fact that the processor core in which the switch LSI notified the unauthorized access is blocked (step 1922 of FIG. 19) is indicated to the maintenance worker. This maintenance information is based on the configuration information that was updated at step 1920 of FIG. 19. FIG. 23A shows yet another example of a maintenance screen. A request for replacing the controller B (FIG. 22) that includes the failed processor core #2 is notified to the maintenance worker (step 1918 of FIG. 19). FIG. 23B and FIG. 23C are block information of the storage subsystem and show that the controller B is blocked.

FIG. 24 is a sequence flowchart showing the operation of the storage subsystem when the processor core is subject to a failure. When the host I/F unit 20 (FIG. 1) receives a write command (S1A) from the host apparatus 12, the associated sorting controller 508 (FIG. 5) decides the controller to handle the processing of the write command (S1), and sends a command to the associated controller (S2).

With the associated controller, the processor core that initially received the command handles the processing of the write command (S3). The associated processor core (□2) accesses the local memory unit 30 (FIG. 1) and reads the control data (S4), and determines the status of hit/miss. In addition, the associated processor core accesses the local memory and reads the control data (S5), and determines whether the data is clean data. The associated processor core thereafter updates the control information of the local memory (S6).

The associated processor core updates the control data backup information of the cache memory unit 22 (S7). Further, the associated processor core sends to the switch LSI 18 (FIG. 1) an access (S8) for setting the transfer parameters (parameters required for the protocol controller to request the transfer of data to the host apparatus) of the protocol controller 500 to the temporary memory 502 (FIG. 5) of the host I/F unit, and an access (S9) for requesting the protocol controller to start the data transfer.

The switch LSI detects that the access of S8 is an unauthorized access, and determines and identifies the associated processor core #2 from the address of the access S8 (S9A). The switch LSI, subsequent to the unauthorized access (S8), abandons the access (S9) for starting up the protocol controller that was issued from the associated processor pursuant to the queue processing (S9A), and sends a failure notice to the associated processor core #2 by way of interrupt processing (S10).

The associated processor core reads the unauthorized access processor core storage register of the switch LSI (S11), determines the failure of the self-processor (S12), and further determines to block the self-processor core (S13). The associated processor core thereafter clears the failure flag of the unauthorized access processor core failure register (S14). The associated processor core updates the configuration information in the cache memory (S15). The associated processor core thereafter displays that the self-processor core will be blocked on the maintenance screen, and urges the maintenance worker to replace the controller (S17), and then blocks the self-processor core (S17).

Meanwhile, since a reply to the write command is not returned from the storage subsystem during the foregoing process, the host apparatus retries to issue the write command (S18A). The operation from S18 to S23 is the same as S1 to S7 described above. This operation is executed by the processor core #1 in an operational status since the processor core #2 is blocked.

Since the access (corresponding to S24:S8) for setting the parameters by the associated processor core #1 is not an unauthorized access, this access is transferred to the protocol controller 500 of the host I/F unit by the switch LSI. The access (corresponding to S25:S9) for starting up the protocol controller is also transferred to the protocol controller without being cut off by the switch LSI.

The protocol controller 500 reads the transfer parameters from the temporary memory 502 (S26), and sends a user data transfer request to the host apparatus 14 (S27). The protocol controller receives the user data and stores this in the temporary memory (S28). Subsequently, the protocol controller notifies the completion of transfer to the associated processor core (S29). The associated processor core that received this notice sets the transfer parameters (parameters required for transferring data from the temporary memory to the cache memory unit 22) in the temporary memory 502, and sends an access for starting up the DMA 510 to the host I/F unit (S30).

The DMA reads the transfer parameters from the temporary memory 502 (S31), and writes the user data into the cache memory unit (S32). The cache memory unit stores the user data, and returns the status to the host I/F unit (S33). The DMA 504 sends the transfer end status to the associated processor core (S34). The associated processor core notifies the end status to the protocol controller (S35), and updates the LRU control information in the local memory 30 (S37). The protocol controller that received the transfer end status sends the end status to the host apparatus (S36).

In the foregoing embodiment, although the real address with the arrival goal of the access from the processor core was set as the setting value of the target mapping table, the present invention is not limited thereto, and a prescribed function may be used for the switch LSI to map the virtual address to a real address.

The present invention may be applied to uses of identifying a failed processor core in a storage subsystem applied to a storage controller configured from a multi processor core, and providing a data storage service without affecting the processing of other processor cores.

The invention claimed is:

1. A storage subsystem, comprising:
   a control circuit including a plurality of processor cores;
   a controlled unit for receiving control from the control circuit and providing a data storage service to a host apparatus; and
   a switch circuit for connecting the control circuit to the controlled unit;
   wherein a first address space is applied to the controlled unit;
   wherein a second address space that is different from the first address space is applied to the control circuit;
   wherein the second address space is assigned to an access to be issued to the switch circuit from each of the plurality of processor cores;
   wherein the switch circuit determines a processor core that issued the access based on an address belonging to the second address space; and
   wherein an address contained in the access from the processor core is mapped to an address of the first address space.

2. The storage subsystem according to claim 1,
   wherein the controlled unit comprises:
   a first interface to the host apparatus;
   a second interface to a memory device; and
   a cache memory for temporarily storing data between the first and second interfaces;
   wherein a common logical address is applied as the first address space to the respective storage areas of the first interface, the second interface and the cache memory;

wherein the control circuit and the switch circuit are connected via PCI-Express;
wherein addresses belonging to the second address space are assigned so as not to mutually overlap to an access from each of the plurality of processor cores;
wherein the switch circuit includes a mapping table for mapping an address belonging to the second address space to the first address space;
wherein a different mapping table is applied to each of a plurality of areas belonging to an address range of the access issued from the processor core;
wherein the processor core seeks an address belonging to the first address space by adding at least a part of an address of the access issued from the processor core to a setting value of the mapping table, and transfers the access to a target controlled unit according to the address of that access;
wherein the setting value is configured from an address belonging to the first address space applied to the controlled unit to be accessed by the processor core; and
wherein the switch circuit further includes a register for detecting whether an access from the processor core is unauthorized, and recording the processor core that issued the unauthorized access, and does not transfer an access from the processor core registered in that register to the controlled unit.

3. The storage subsystem according to claim 1,
wherein the controlled unit comprises:
a first interface to the host apparatus;
a second interface to a memory device; and
a cache memory for temporarily storing data between the first and second interfaces;
wherein a common logical address is applied as the first address space to the respective storage areas of the first interface, the second interface and the cache memory; and
wherein the control circuit and the switch circuit are connected via PCI-Express.

4. The storage subsystem according to claim 3,
wherein addresses belonging to the second address space are assigned so as not to mutually overlap to an access from each of the plurality of processor cores.

5. The storage subsystem according to claim 4,
wherein the switch circuit includes a mapping table for mapping an address belonging to the second address space to the first address space;
wherein a different mapping table is applied to each of a plurality of areas belonging to an address range of the access issued from the processor core; and
wherein a setting value of the mapping table is applied to an address of the access issued from the processor core, and the address of that access is mapped to an address of the first address space.

6. The storage subsystem according to claim 5,
wherein the switch circuit seeks an address belonging to the first address space by adding the setting value to all or a part of an address of an access issued by the processor core, and transfers the access to a target controlled unit according to that address.

7. The storage subsystem according to claim 5,
wherein the setting value is configured from an address belonging to the first address space applied to the controlled unit to be accessed by the processor core.

8. The storage subsystem according to claim 5,
wherein the processor core changes the setting value of the mapping table so that an address of an access to be issued by itself is mapped to an address space of the controlled unit to be accessed.

9. The storage subsystem according to claim 8,
wherein the processor core selects a mapping table from a plurality of mapping tables so that an address of an access is mapped to an address space of the controlled unit to be accessed, issues an access to the switch circuit using an address corresponding to the selected mapping table, and the switch circuit applies an address of the access to the setting value of the selected mapping table.

10. The storage subsystem according to claim 7,
wherein, if the processor core determines that there is no mapping table with the setting value, the processor core selects one mapping table among a plurality of mapping tables in which its history of being used by the switch circuit for mapping is old, and changes the setting value of that mapping table.

11. The storage subsystem according to claim 1,
wherein the switch circuit detects whether an access from the processor core is unauthorized, and does not transfer the unauthorized access to the controlled unit.

12. The storage subsystem according to claim 11,
wherein the switch circuit comprises a register for recording a processor core that issued the unauthorized access, and does not transfer an access from the processor core registered in that register to the controlled unit.

13. The storage subsystem according to claim 12,
wherein, if the switch circuit determines that an access issued from the processor core was unauthorized a prescribed number of times, a controller that received the determination result blocks the processor core that issued the unauthorized access; and
wherein another control circuit among the plurality of control circuits performs command processing in substitute for the control circuit including the blocked processor core.

14. The storage subsystem according to claim 12,
wherein the controlled unit comprises:
a first interface to the host apparatus;
a second interface to a memory device; and
a cache memory for temporarily storing data between the first and second interfaces;
wherein the switch circuit uses a first access from the processor core to set a parameter for transferring data from the host apparatus to a protocol controller of the first interface, and uses a second access from the processor core to start up the protocol controller and transfer data from the host apparatus based on the parameter;
wherein, if the switch circuit determines that the first access is unauthorized, the switch circuit records the processor core that issued that first access in the register; and
wherein the switch circuit refers to the recorded contents of that register and does not transfer the second access.

15. A control method of a storage subsystem, comprising:
a control circuit including a plurality of processor cores;
a controlled unit for receiving control from the control circuit and providing a data storage service to a host apparatus; and
a switch circuit for connecting the control circuit to the controlled unit;
wherein a first address space is applied to the controlled init; and
wherein a second address space that is different from the first address space is applied to the control circuit;

wherein the control method includes the steps of:

the switch circuit determining a processor core that issued the access based on an address belonging to the second address space; and mapping an address contained in the access from the processor core to an address of the first address space.

* * * * *